US012393961B2

(12) United States Patent
George et al.

(10) Patent No.: US 12,393,961 B2
(45) Date of Patent: Aug. 19, 2025

(54) AUTOMATIC DISCOUNT CODE ENTRY AND EVALUATION

(71) Applicant: Checkmate Savings Inc., Santa Monica, CA (US)

(72) Inventors: Cody George, Los Angeles, CA (US); Rory Garton-Smith, Los Angeles, CA (US); Elliot Rampono, New York, NY (US)

(73) Assignee: Checkmate Savings Inc., Santa Monica, CA (US)

( * ) Notice: Subject to any disclaimer, the term of this patent is extended or adjusted under 35 U.S.C. 154(b) by 0 days.

(21) Appl. No.: 18/957,728

(22) Filed: Nov. 23, 2024

(65) Prior Publication Data

US 2025/0086671 A1    Mar. 13, 2025

Related U.S. Application Data

(62) Division of application No. 18/215,585, filed on Jun. 28, 2023, now Pat. No. 12,169,846.

(51) Int. Cl.
*G06Q 30/02* (2023.01)
*G06Q 30/0207* (2023.01)
*G06Q 30/0601* (2023.01)

(52) U.S. Cl.
CPC ..... *G06Q 30/0222* (2013.01); *G06Q 30/0633* (2013.01)

(58) Field of Classification Search
CPC ................ G06Q 30/0222; G06Q 30/0633
See application file for complete search history.

(56) References Cited

U.S. PATENT DOCUMENTS 5,611,031 A * 3/1997 Hertzfeld .............. G06F 3/0481
715/740
11,869,027 B1 * 1/2024 Corrieri ............. G06Q 30/0222

* cited by examiner

*Primary Examiner* — Dipen M Patel

(57) ABSTRACT

In one embodiment, a method includes accessing a website of a known merchant and creating an active shopping cart on the website of the known merchant. The method further includes applying a discount code at a UI element of the website for inputting discount codes, collecting a network trace of the applied discount code, and translating the network trace of the applied discount code to an ECMA class format.

8 Claims, 3 Drawing Sheets

ABSTRACT DISCOUNT CODE ENTRY AND EVALUATION

AUTOMATIC DISCOUNT CODE ENTRY AND EVALUATION

PRIORITY CLAIM

This application is a divisional of, and claims the benefit of, U.S. patent application Ser. No. 18/215,585, filed Jun. 28, 2023.

TECHNICAL FIELD

This application generally relates to automatic discount code entry and evaluation.

BACKGROUND

Many electronic transactions involve a user electronically adding items to an electronic cart, which electronically identifies the items a user has selected for purchase. When a user is done shopping on a merchant's website or in a merchant's application, then the user can access a checkout interface, which typically allows the user to view the total due for the cart items, enter shipping information and select shipping options, and enter payment information. A checkout UI may also include an element, such as a text box, for entering discount codes, which provide some benefit to the user, such as a discount on one or more goods in the cart, a free gift, etc. Only valid discount codes predetermined by a particular seller are associated with benefits for that seller; invalid codes or codes that are previously valid but are now expired result in no benefit to the user.

DESCRIPTION OF EXAMPLE EMBODIMENTS

The process for entering discount codes is by design a UI-based approach. In other words, at some point in a checkout process a UI element is surfaced to a user in order for the user to input any discount codes for items in the user's shopping cart. The UI element is often a text box, and associated with this text box is an interactive element (e.g., a clickable button labeled "APPLY") that submits the code to a backend server associated with the merchant, which checks the entered code. The UI is updated to reflect whether the code is valid or invalid, and may also be updated with associated information (e.g., the amount of the discount, that an invalid code is expired, etc.).

This conventional UI-centric process can be automated. For example, a program (an application, a browser extension, etc.) may have access to a database of possible codes for a merchant. The program may access each possible code and automatically enter that code into the appropriate UI element, submit the code, await the updated UI response from the backend associated with the merchant, evaluate the related information (e.g., whether the code worked, the amount of a discount, etc.), and track the code (if any) associated with the highest discount. However, this automation of the conventional process includes many inefficiencies and can provide for a frustrating user experience. For example, because the automatic approach still relies on a fundamentally UI-based input approach, the process still invokes the procedures of that approach, such as a page refresh each time a code is submitted. The process also takes a not-insignificant amount of time. For example, automatically entering and evaluating 10 codes may take 5, 10, or 15 seconds and may involve 10 page refreshes, which essentially makes the webpage unusable by the user over the time period in which codes are being evaluated. In addition, data a user attempts to enter during the process (e.g., the user's address) will be lost as a result of the page refreshes. In addition, the result of a code entered via a UI is not always clear, for example if an invalid code results in no surfaced information, and an automated approach to the conventional method must wait an arbitrary long enough time to ensure that entered code was processed by the merchant, or must move on to the next code at some arbitrary time and risk not knowing the result of a previously entered code.

Figure 1:
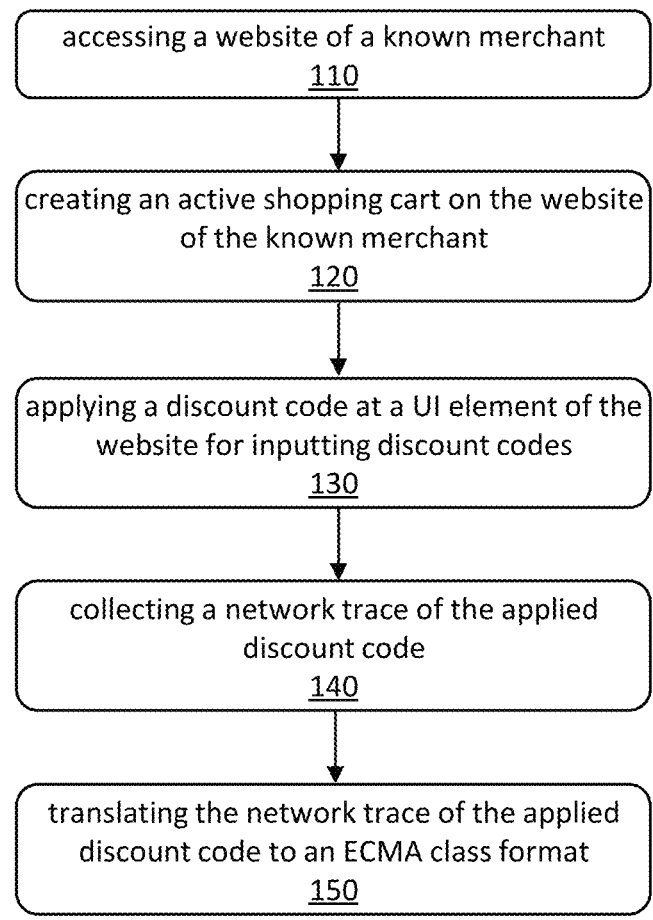
FIG. 1 illustrates an example method of generating a set of API calls for a merchant that determines the merchant's response to discount-code functions.

In contrast, the systems and methods described in this disclosure enter potential codes for a merchant, and obtain related functionality, while bypassing the UI-based approach and its associated flaws, even when the merchant surfaces a UI element for entering codes. As a result, the methods and systems described herein operate much more quickly and efficiently, with more certainty as to code results, and without disrupting a user's use of the checkout interface. FIG. 1 illustrates an example method of generating a set of API calls for a merchant that determines the merchant's response to discount-code functions. Step 110 of the example method of FIG. 1 includes accessing a website of a known merchant. The known merchant may be obtained from, for example, a database of known merchants, and the method of FIG. 1 may be repeated for each of these merchants in the database in order to generate the resultant class code for each merchant. In particular embodiments, step 110 may be performed manually or automatically, e.g., by a script executing the method of FIG. 1.

Step 120 of the example method of FIG. 1 includes creating an active shopping cart on the website of the known merchant. For example, one or more products the merchant sells on the website may be added to a cart. Step 130 of the example method of FIG. 1 includes applying a discount code at a UI element of the website for inputting discount codes. As explained above, this UI element may be, e.g., a text box that is surfaced when a user attempts to checkout their cart. Step 140 of the example method of FIG. 1 includes collecting a network trace of the applied discount code to the active shopping cart. For example, the applied discount code may be submitted to the merchant's backend, and a network trace of this applied code is collected.

Step 150 of the example method of FIG. 1 includes translating the network trace to an ECMA class format. In this disclosure, the class format is a consistent format that can be used and applied to any merchant, although each merchant's set of network traces will result in a different class (i.e., a class specific to that merchant). The ECMA class format may be an ES6 class format or may be a format that is convertible to ES6 (e.g., an ECMA format having a version greater than ES6).

For example, suppose a merchant named Merchant 1 is the current subject of the example method of FIG. 1. After steps 110 to 140, step 150 creates a class "Merchant1API" for that merchant. As explained below, the class contains functions, or methods, that an end user can subsequently call on their client device to enter discount codes for that merchant.

Step 150 may include copying the contents of a network trace as an HTTP fetch request. For instance, an example resultant fetch call for Merchant 1 applying a code "CODE1" is:

```
fetch('https://merchant1.com/checkout/382dd58116f8a/reduction', {
  method: 'POST',
  body: JSON.stringify({
    code: 'CODET'
  }),
});
```

In particular embodiments, different kinds of codes associated with different functionality may be input to a merchant website, and a network trace performed for each of the different kinds of codes. For example, network traces to apply codes, remove codes and determine cart totals may be obtained, as each procedure is associated with distinct functionality and therefore with a distinct response from the merchant's backend endpoint (e.g., backend server). The network traces are translated to the ES6 class format and put into the class corresponding to the merchant (e.g., class "Merchant1API" for Merchant 1, although any suitable class name may be used for a particular merchant). For instance, an example ES6 class format for obtaining a cart total, applying a code, and removing a code are as follows:

the items in the cart. However, a cart total also includes non-monetary aspects, such as the provision of rewards points or a free gift in association with cart purchase made using a particular discount code. In other words, cart total refers to the total monetary and non-monetary conditions associated with a particular cart.

In particular embodiments, different types of codes may be applied and a network trace associated with each code. For example, a code that results in monetary rewards may be applied and the resultant network trace may be converted to the ES6 format. As another example, a code that results in non-monetary rewards (e.g., a free gift) may also be applied, and the resultant network trace may separately be converted to the ES6 format. As explained more fully herein, the result of example method of FIG. 1 is to build up the ES6 code library for a merchant so that any number of codes may be applied to a merchant's website while bypassing the UI-based approach, so that the resultant response, which comes directly from the backend associated with the merchant, can be understood.

While the examples above discuss translating the network trace to an ES6 class format, this disclosure contemplates that other class formats may be used, such as for example other formats in the ECMA script standard. Moreover, this disclosure contemplates that other programming languages may be used to represent the class format described herein.

```
{
  async isAtCheckout( ): Promise<boolean> {
    return location.hostname.startsWith('https://merchant1.com/checkout');
  }
  async getCartTotal( ): Promise<number> { //obtains cart total
    const apiResponse = await fetch(
      'https://merchant1.com/cart.json',
    ). then((x) => x.json( );
    const total = parseFloat(apiResponse.data.cartTotal);
    return total;
  }
  async applyCoupon(couponCode: string): Promise number> { //applies a discount code
    const apiResponse = await fetch(
      'https://merchant1.com/checkout/382dd58116f8a/reduction',
      {
        method: 'POST',
        body: JSON.stringify({
          code: couponCode,
        })
      },
    ). then((x) => x.json( ));
    const total = parseFloat(apiResponse.data cartSummary.estimated Total);
    return total;
  }
  async removeCode(couponCode: string): Promise<number> { //removes a code
    const apiResponse = await fetch(
      'https://merchant1.com/checkout/382dd58116f8a/reduction',
      {
        method: 'DELETE',
        body: JSON stringify({
          code: couponCode,
        }),
      },
    ) then((x) => x json( ));
    const total = parseFloat(apiResponse.data.cartSummary estimatedTotal);
    return total;
  }
}
```

Here, the text following the "merchant1.com" domain are examples of a particular address of a checkout interface for Merchant 1, and in practice, the actual address would be used.

As used herein, a cart total often refers to a purely monetary aspect, i.e., a total monetary amount to be paid for In particular embodiments, the ES6 code is transpiled to a different ECMA Script version. For example, the ES6 code may be transpiled to an ES5 format, using any suitable tool for transpiling the code. For example, transpiling the code may result in code that is compatible with more web browsers used to access a merchant's site. (As used herein, a web browser refers to an application that functions as a general web browser, as well as to applications that are specific to one or more merchants and access web content from that merchant). In particular embodiments, the resulting transpiled code may be hosted on a server device and compressed, for example with an LZ compression technique to reduce the code's size.

The method of FIG. 1 may be performed for each of a number of merchants (e.g., 10,000 merchants, several million merchants, etc.), thereby creating a code database corresponding to the number of merchants.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 3, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 3, by a processor coupled to non-transitory computer readable storage media, or any suitable combination thereof.

Figure 2:
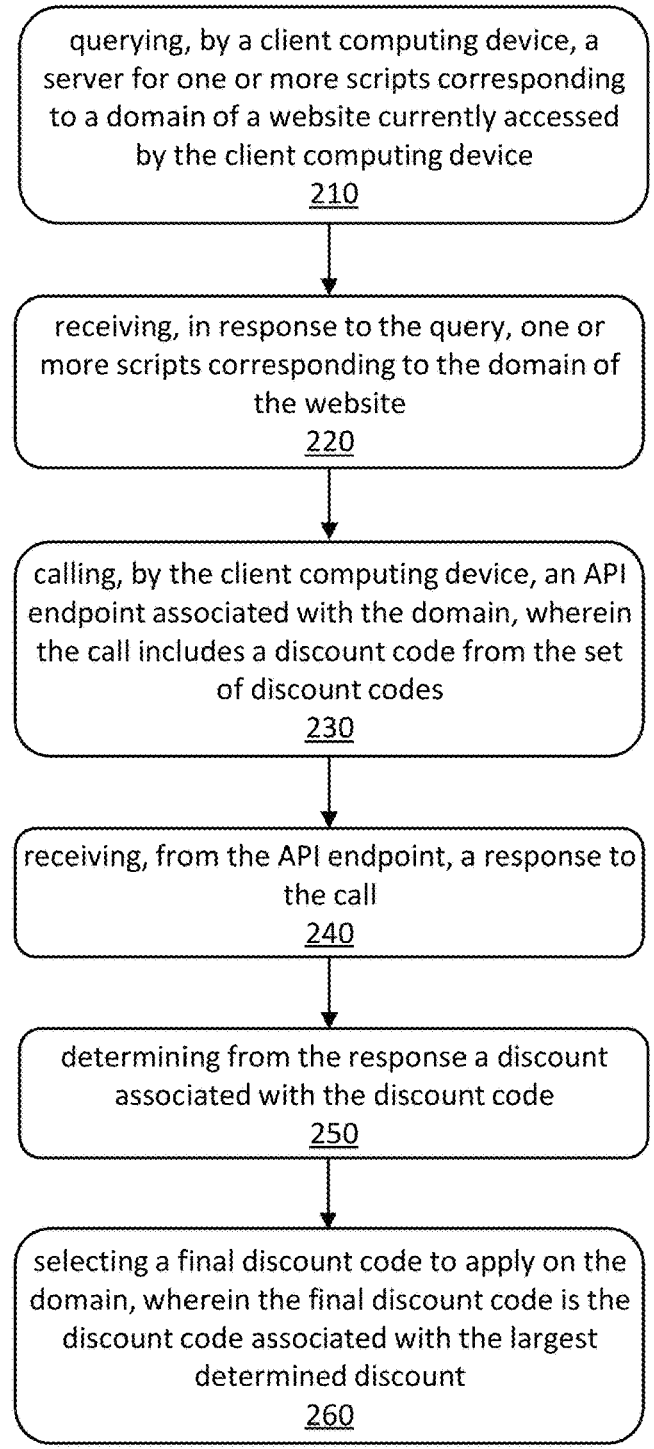
FIG. 2 illustrates an example of a client device using a script to apply discount codes and select for use the discount code associated with the highest benefit.

FIG. 2 illustrates an example method of a client device using a script from the merchant database discussed above to try various known discount codes and select for use the discount code associated with the highest benefit. The method occurs when a web browser on the client device navigates to a website. Step 210 of the example method of FIG. 2 includes the client device (e.g., via an application, a web-browser extension, or other script on the client device) querying the server for any script (e.g., an ES5 script) associated with the website domain. For example, if a web browser on the client device navigates to merchant1.com, then the client device would query the server for all scripts associated with the merchant1 domain.

Step 220 of the example method of FIG. 2 includes receiving, in response to the query, one or more scripts corresponding to the domain of the website. These scripts may be, for example, the compressed ES5 scripts described in connection with the example method of FIG. 1. The server may also send discount codes associated with the merchant domain. For example, the server may send all discount codes associated with a merchant domain that are stored in a server-side database or that are accessible by the server. Steps 230-250 are then performed for each discount code received by the client device.

Step 230 includes calling, by the client computing device, an API endpoint associated with the domain, wherein the call includes a discount code from the set of discount codes. For example, the API call may invoke the methods created in the example of FIG. 1, above, for the class corresponding to the particular merchant. For example, the method may invoke an applyCoupon method for a particular discount code associated with the merchant. The API endpoint is the same endpoint that was accessed in the example method of FIG. 1 to create the calls, and therefore the appropriate calls to, and response from, this endpoint are known, even though different endpoints may have different calls and responses. For example, the applyCoupon method, the removeCoupon method, and the getCartTotal method may each communication with a different API endpoint, in particular embodiments. Step 240 includes receiving a response to the call made to the merchant's endpoint server, and step 250 includes determining from the response a discount associated with the discount code. For example, a getCartTotal method may be invoked to get the cart total from the endpoint server if a particular discount code is used. In particular embodiments, a removeCode method may be invoked between applyCoupon methods for different discount codes.

Step 260 of the example method of FIG. 2 includes selecting a final discount code to apply on the domain, where the final discount code is the discount code associated with the largest determined discount. For example, particular embodiments may determine a cart total before any discount codes are applied for items currently in a user's cart on the client computing device, and then may compare this cart total to subsequent cart totals obtained from the endpoint server in association with particular discount codes. Once all discount codes received by the client device have been tried, then the code associated with the largest discount can be selected and applied to the cart or can be displayed for a user to input into the UI-based discount-code element (e.g., textbox), and the method may end.

Example code for obtaining scripts from a server at a "server.com" domain for Merchant 1 at a "merchant1.com" domain is as follows:

```
const script = await fetch("https://server.com/?domain=merchant1.com"). then(x =>
decompressLZ(x));
const api = evaluate(script);
const codes = const script = await
fetch("https://server.com/codes/?domain=merchant1.com").
then(x => x.json( ));
    Example code for using the api scripts is as follows:
if(api.isA(Checkout( ){
    const startingCartTotal = await api.getCartTotal( );
    for(code of codes) {
    const newCartTotal = await api.applyCoupon(code)
    if(newCartTotal < startingCartTotal){
        // the code applied has reduced the cart total, saving the user money.
    }
    await api.removeCoupon(code);
    }
}
```

In particular embodiment, the example method of FIG. 2 may be performed when the web browser is at a checkout page (i.e., when if (api.isAtCheckout( )) is true). In particular embodiments, the method of FIG. 2 may be performed when or as a user adds items to a cart, i.e., the best discount code for a current cart configuration may be determined in the background, even before a user reaches the checkout user interface.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 3, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 3, by a processor coupled to non-transitory computer readable storage media, or any suitable combination thereof.

Figure 3:
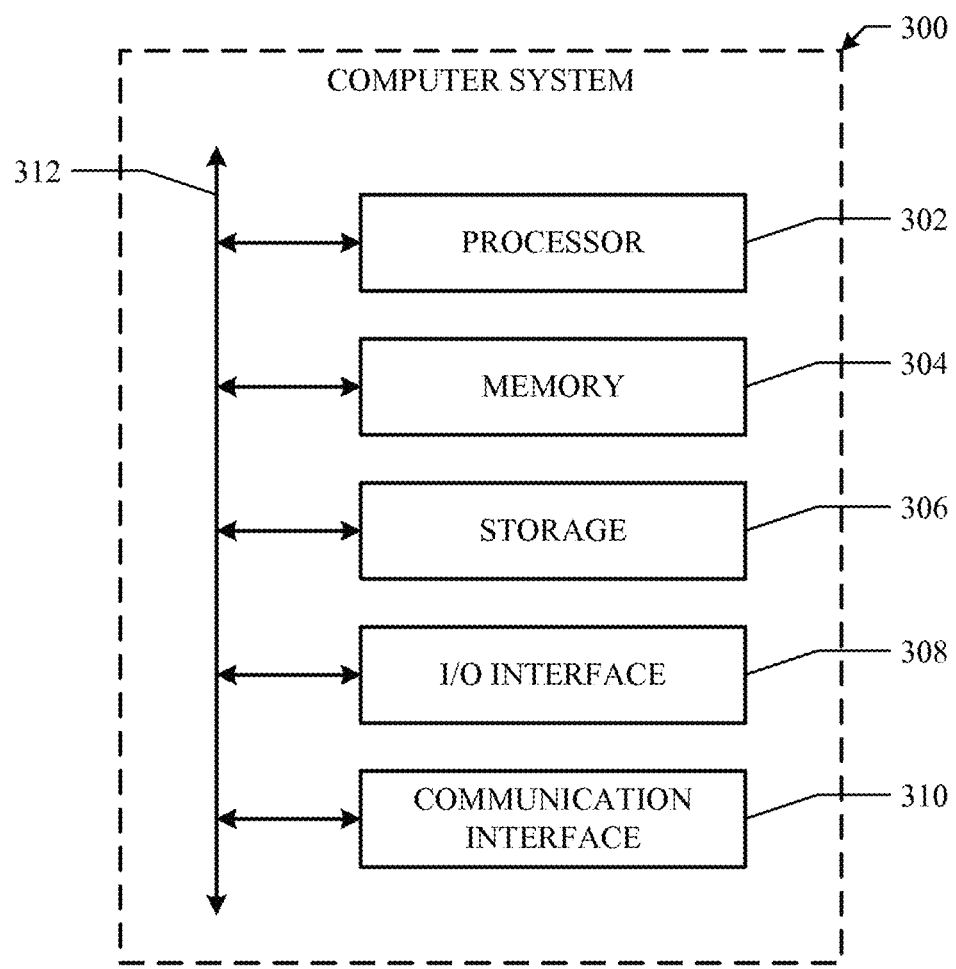
FIG. 3 illustrates an example computing system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate.

Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   querying, by a client computing device, a server for one or more scripts corresponding to a domain of a website currently accessed by the client computing device;
   receiving, in response to the query, one or more scripts corresponding to the domain of the website, wherein:
      each of the one or more scripts comprise a translated network trace comprising an application programming interface (API) call to an endpoint associated with the domain;
      each translated network trace was translated to an ECMA class format from a network trace comprising a response from the endpoint to an applied discount code, from a set of discount codes, at a UI element of a website of the merchant;
   for each discount code of the set of discount codes associated with the domain, and in response to the client computing device (1) accessing a checkout webpage of the known merchant or (2) modifying a cart of the known merchant, automatically applying the respective discount code associated with the domain without refreshing a user interface of the checkout webpage by:
      calling, by the client computing device, the API endpoint associated with the domain using the API call associated with the respective discount;
      receiving, from the endpoint, a response to the API call; and
      determining, by the client computing device, from the response a discount associated with the respective discount code; and
   selecting, by the client computing device a final discount code to apply on the domain, wherein the final discount code is the discount code associated with the largest determined discount.

2. The method of claim 1, wherein the ECMA class format comprises an ES6 class format or a format that is convertible to ES6.

3. The method of claim 2, wherein determining from the response a discount associated with the discount code comprises:
   executing, by the client computing device, a getCartTotal method obtained from the one or more scripts;
   determining, from the response from the API endpoint in response to the getCartTotal method, a cart total associated with the discount code; and
   determining the discount associated with the discount code based on the cart total associated with the discount code and a cart total when no discount code is applied.

4. The method of claim 1, wherein calling, by the client computing device executing at least one of the one or more scripts, an API endpoint associated with the domain comprises executing, by the client computing device, an applyCoupon method obtained from the one or more scripts.

5. One or more computer readable storage media embodying software that, when executed by one or more processors coupled to the media, is operable to:
   query a server for one or more scripts corresponding to a domain of a website currently accessed by a client computing device;
   access one or more scripts corresponding to the domain of the website, wherein:
      each of the one or more scripts comprise a translated network trace comprising an application programming interface (API) call to an endpoint associated with the domain;
      each translated network trace was translated to an ECMA class format from a network trace comprising a response from the endpoint to an applied discount code, from a set of discount codes, at a UI element of a website of the merchant;
   for each discount code of the set of discount codes associated with the domain, and in response to the client computing device (1) accessing a checkout webpage of the known merchant or (2) modifying a cart of the known merchant, automatically apply the respective discount code associated with the domain without refreshing a user interface of the checkout webpage by:
      calling the API endpoint associated with the domain using the API call associated with the respective discount to the;
      accessing a response to the API call sent from the endpoint,;
      determining from the response a discount associated with the respective discount code; and
   select a final discount code to apply on the domain, wherein the final discount code is the discount code associated with the largest determined discount.

6. The media of claim 5, wherein the ECMA class format comprises an ES6 class format or a format that is convertible to ES6.

7. The media of claim 6, wherein determining from the response a discount associated with the discount code comprises:
   executing a getCartTotal method obtained from the one or more scripts;
   determining, from the response from the API endpoint in response to the getCartTotal method, a cart total associated with the discount code; and
   determining the discount associated with the discount code based on the cart total associated with the discount code and a cart total when no discount code is applied.

8. The method of claim 1, wherein calling, by the client computing device executing at least one of the one or more scripts, an API endpoint associated with the domain comprises executing, by the client computing device, an applyCoupon method obtained from the one or more scripts.

* * * * *